United States Patent Office 2,819,211
Patented Jan. 7, 1958

2,819,211

SULFITE ESTER SYNTHETIC LUBRICANTS

Louis A. Mikeska and Jeffrey H. Bartlett, Westfield, Charles E. Thompson, Mountainside, and Arnold J. Morway, Rahway, N. J., assignors to Esso Research and Engineering Company, a corporation of Delaware No Drawing. Application February 27, 1953
Serial No. 339,491

6 Claims. (Cl. 252—42.1)

This invention relates to synthetic lubricating compositions. Particularly the invention relates to synthetic lubricating compositions which comprise the sulfite esters of organic compounds which contain at least one hydroxyl group that is alcoholic in nature.

In recent efforts to obtain superior lubricating compositions which have unusual and specific properties, there have been developed entirely new synthetic materials with lubricating properties. In general these new synthetic lubricants are characterized by viscosity properties that are outstanding at both low and high temperatures, especially when compared to mineral oils. These outstanding low and high temperature properties are especially desirable for use in equipment designed to operate over a great temperature differential, such as jet engines or turbines for aircraft use, internal combustion reciprocating engines for aircraft and the like.

It has been found that synthetic lubricants may be desirable for the lubrication of standard automotive engines. In addition to the versatility of their viscosity-temperature relationships, some types of the synthetic lubricants investigated have another advantage in that their use has been found to result in very low rates of combustion chamber deposit formation, particularly when they are used for long periods of time. Low rates of formation of combustion chamber deposits result in a more efficient utilization of fuel, less increase in the octane requirement of an engine, less pre-ignition tendency, and a general overall improvement in engine operation. These lubricants may also serve to reduce or remove combustion chamber deposits from an engine already containing such deposits.

The present invention relates to a new type of synthetic lubricating composition which comprises the sulfite esters of organic compounds that contain at least one hydroxyl group that is alcoholic in nature, that is, which gives the characteristic reactions of an alcoholic hydroxyl group. A generic formula for the compounds of invention may be written as follows:

$$A-O-S-O-B$$
$$\parallel$$
$$O$$

In the formula A and B represent the organic compound containing at least one free hydroxyl group that is alcoholic in nature, less the hydroxyl group; that is to say, it is the radical derived from such compound.

These new esters may be readily prepared by treating the appropriate organic compound with thionyl chloride, as such, or in the presence of a tertiary amine such as dimethyl aniline, or pyridine. The reaction may be illustrated by the following equation in which the organic hydroxyl containing compound is alcohol:

The formation of the sulfite ester may occur in two stages as follows:

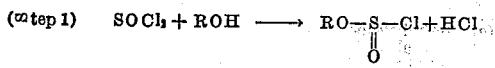

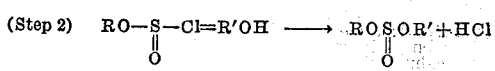

Thus it is possible, by proper reaction control to use two different organic hydroxyl containing compounds to fully esterify the sulfurous compound, and A and B of the type formula may be alike or different. It is also possible to treat a mixture of alcohols with the $SOCl_2$ to produce mixed esters.

For use in reciprocating engines, particularly as a lubricant for automotive engines, a lubricating composition must meet several requirements. In order to form an effective lubricating film and to maintain that film at low and high temperatures it must have certain viscosity characteristics. At low temperatures the lubricant must be sufficiently labile to flow through the circulatory system of the equipment and allow movement of lubricated surfaces without an undue power requirement. In general, a lubricant should have an ASTM pour point below about $+35°$ F. so that it will have sufficient low temperature lability to make it satisfactory in these respects. At high temperatures a lubricant must have sufficient "body" or "thickness" to furnish and maintain a satisfactory lubricating film. It has been found that a lubricant that is satisfactory in this respect will have a viscosity at 210° F. of between about 2 to 60 centistokes or about 30 to 280 Saybolt seconds, Universal. To prevent undue lubricant loss due to volatility and general molecular disintegration, and to insure against explosion hazards at higher temperatures sometimes encountered, a lubricating composition should have a flash point in excess of about 300° F. These requisites are inherent in the term "lubricating compositions," as used in this specification, and the sulfite esters of this invention are limited to those within these operable ranges. The preferred materials, as contemplated herein and as described in the preferred embodiment hereof, will have an ASTM pour point below about $-15°$ F., a flash point above about 375° F., and will have a viscosity within the range of 2.6 to 13 centistokes or 35 to 170 Saybolt seconds, Universal, at 210° F.

In general it has been found that the above listed properties are a function both of molecular structure and of molecular weight. This fact makes it possible, within certain limits, to prepare compositions having similar low and high temperature properties in a variety of ways and also enables the manufacturer to "tailor" a composition to fit a certain set of specifications within rather general limits. The large number of organic materials containing alcoholic hydroxyl groups available for preparing the compositions of this invention makes it possible to prepare a wide range of lubricants.

These organic hydroxy compounds may contain as many as 60 carbon atoms. It is essential, however, that the total number of carbon atoms in the average sulfite ester molecule be between about 20 to about 120, with from 25 to 100 total carbon atoms being especially preferred. Those esters containing fewer than about 20 carbon atoms have been found to be lacking in desirable high temperature viscosity characteristics and those having more than 130 are usually too viscous at low temperatures.

$$SOCl_2 + 2ROH \longrightarrow ROSOR + 2HCl$$
$$\parallel$$
$$O$$

The materials used to prepare these esters, that is, organic hydroxy compounds containing at least one free hydroxyl group which is alcoholic in character, may be selected from the following partial list. Others may, of course, be used.

I. Unsubstituted alcohols
  A. Monohydric
    1. Aliphatic
      (a) Methyl alcohol
      (b) Ethyl alcohol
      (c) Propyl alcohol
      (d) Isopropyl alcohol
      (e) n-Butyl alcohol
      (f) Iso-butyl alcohol
      (g) Sec.-butyl alcohol
      (h) Tert.-butyl alcohol
      (i) n-Amyl alcohol
      (j) Iso-amyl alcohol
      (k) n-Hexyl alcohol
      (l) Iso-hexyl alcohol
      (m) 2-ethyl-1-butanol
      (n) 2-ethyl-1-hexanol
      (o) Octyl alcohol
      (p) Iso-octyl alcohol
      (q) 2-octanol
      (r) Iso-nonyl alcohol
      (s) Decyl alcohol
      (t) Lauryl alcohol
      (u) Tetradecyl alcohol
      (v) Pentadecyl alcohol
      (w) Octadecyl alcohol
      (x) Allyl alcohol
      (y) Crotyl alcohol
      (z) Oleyl alcohol
      (aa) The terpineols
      (bb) $C_3$ to $C_{20}$ Oxo alcohols
      (cc) Alcohols derived from the "Synol" process
      (dd) Alcohols derived from the oxidation of petroleum fractions
      (ee) Alcohols derived from Guerbert's reaction
      (ff) Alcohols derived from the hydration of olefins
      (gg) Alcohols derived via the "Oxyl" synthesis
      (hh) Mixtures of the above
    2. Aromatic
      (a) Benzyl alcohol
      (b) Phenethyl alcohol
      (c) 3-phenyl 1-propanol
      (d) $\alpha$-Naphthyl carbinol
      (e) Cinnamyl alcohol
      (f) Diphenyl carbinol
      (g) Furfuryl alcohol
      (h) Cumic alcohol
      (i) Vanillyl alcohol
      (j) Piperonyl alcohol
  B. Polyhydric
    1. Glycols
      (a) Ethylene glycol
      (b) 1,2-propanediol
      (c) 1,3-propanediol
      (d) 1,3-butanediol
      (e) 1,4-butanediol
      (f) 1,5-pentanediol
      (g) The various polyalkylene glycols, e. g.
        1. Polyethylene glycols
          (a) Diethylene glycol
          (b) Triethylene glycol
          (c) Tetraethylene glycol
        2. Polypropylene glycols
          (a) Dipropylene glycol
          (b) Tripropylene glycol
      (h) 1,2-cyclohexanediol
      (i) Decanediol-1,10
    2. Other polyhydric alcohols
      (a) Glycerol
      (b) 2-hydroxymethyl-2-methyl propanediol-1,3
      (c) Pentaerythritol
      (d) Sorbitol
      (e) Dipentaerythritol
      (f) Dulcitol
      (g) Trimethylol propane
      (h) Tetramethylol cyclohexanol
      (i) Benzotrimethylol
II. Substituted alcohols
  A. Monohydric
    1. Aliphatic
      (a) Halogenated alcohols
        1. Ethylene chlorohydrin
        2. Trifluoro ethanol
        3. Propylene chlorohydrin
        4. The various chloro-substituted monoethers of polyalkylene glycols
      (b) Ethanolamine
      (c) 2-amino propanol
      (d) 2-nitroethanol
      (e) 2-Nitropropanol
      (f) 2-nitrobutanol
      (g) The various glycol monoesters, e. g.
        1. Ethylene glycol monoacetate
        2. Propylene glycol monobutyrate
        3. Butylene glycol monolaurate
        4. Polyethylene glycol monoesters
        5. Polypropylene glycol monoesters
        6. Polybutylene glycol monoesters
      (h) The various glycol monoethers, e. g.
        1. Ethylene glycol mono-methyl ether
        2. Propylene glycol mono-butyl ether
        3. Butylene glycol mono-lauryl ether
        4. Polyethylene glycol mono-ethers
        5. Polypropylene glycol mono-ethers
        6. Polybutylene glycol mono-ethers
        7. Polytrimethylene glycol mono-ethers
      (i) The various glycol mono-formals, e. g. the mixed formals of glycols and alcohols
      (j) Hydroxy Alkyl cyanides
        1. Ethylene cyanohydrin
        2. $\alpha$-Hydroxy isobutyronitrile
      (k) Ethanol morpholine
    2. Aromatic
      (a) p-Methoxy benzyl alcohol
      (b) The various chlorobenzyl alcohols
      (c) The various nitrobenzyl alcohols
      (d) 2-anilino ethanol
  B. Polyhydric
    1. Glycols
      (a) Halogenated glycols, e. g.
        1. 3-chloro-1,2-propanediol
        2. 2-chloro-1,3-propanediol
      (b) Nitroglycols, e. g.
        1. 2-nitro-1,3-propanediol
        2. 2-nitro-2-methyl-propanediol-1,3
        3. Trimethylol nitromethane
      (c) Amino glycols
        1. 2-amino-1,3-propanediol
        2. 2-amino-2-methyl-1,3-propanediol
        3. Diethanol amine
        4. Trimethylol aminomethane
  C. Other hydroxy compounds
    1. Esters of hydroxy acids
      (a) The various lactate esters
      (b) The various glycolate esters
      (c) The various hydroxy stearate esters
    2. Carbonyl substituted alcohols
      (a) Hydroxy ketones, e. g.
        1. Hydroxy acetone
      (b) Hydroxy aldehydes, e. g.
        1. $\alpha$-Hydroxy adipaldehyde
        2. $\beta$-Hydroxy propionaldehyde Particularly desirable organic hydroxyl compounds for use in this invention are those highly branched chain aliphatic alcohols prepared by the "Oxo" synthesis. The "Oxo" synthesis may be described as being the catalytic reaction of an olefin with carbon monoxide and hydrogen. The reaction occurs at temperatures in the order of 300°–400° F., at pressures in the range of about 1000 to 3000 p. s. i., in the presence of a suitable catalyst, ordinarily a heavy metal salt such as cobalt acetate. The resulting aldehyde is subsequently hydrogenated to a primary alcohol having one more carbon atom than the original olefin. This process is described in U. S. Patent No. 2,327,066 issued to Roelen in 1943.

It has been found that particularly desirable alcohols for the formation of the formals of this invention can be prepared by the application of the Oxo synthesis to polymers and copolymers of $C_3$ and $C_4$ monoolefins. These monoolefins are readily available in petroleum refinery streams, and processes for their conversion to liquid copolymers have been worked out by the art. One such process, known as U. O. P. polymerization, consists of passing the olefin-containing stream in liquid phase in contact with an acid catalyst comprising phosphoric acid impregnated on kieselguhr. Other acidic catalysts, such as phosphoric acid or copper phosphate impregnated on silica gel, sulfuric acid, Friedel-Crafts catalysts, activated clays, silica-alumina, copper pyrophosphate, etc. may be used. Suitable conditions when employing phosphoric acid catalysts of the U. O. P. type are temperatures of 300° F. to 500° F., pressures of 250 to 5,000 p. s. i. and feed stocks comprising refinery streams containing propylene and mixed butylenes. Suitable feed stocks, for example, may contain from 15 to 60 mol percent propylene, from 0.5 to 15 mol percent butylenes, and from 0.1 to 10 mol percent isobutylene, the remaining being saturated hydrocarbons. Other suitable feed stocks are the dimer and trimer of isobutylene.

The preferred Oxo alcohols employed in forming the sulfites of this invention are those having from 8 to 20 carbon atoms derived from olefin copolymers having from 7 to 19 carbon atoms. In preparing these Oxo alcohols the desired olefin fraction is segregated from the crude olefin polymer product by fractionation.

The following table, for example, shows the structure and percent composition of $C_8$ Oxo alcohols prepared from a $C_7$ olefin stream which had been fractionated from the products obtained by the phosphoric acid polymerization of refinery gas streams containing propylene and mixed n- and isobutylenes.

| Structure of $C_8$ Oxo Alcohols Prepared From $C_3$-$C_4$ Copolymer Heptenes | Percent |
|---|---|
| C—C—C(C)—C(C)—C—C—OH | 29 |
| C—C—C(C)—C—C(C)—C—OH | 25 |
| C—C—C(C)—C(C)—C—C—OH | 17 |
| C—C—C(C)—C—C—C—OH | 16 |
| C—C—C—C(C)—C—C—OH |  |
| C—C—C(C)—C—C—C—OH | 2.3 |
| C—C(C)—C—C—C—C—OH | 1.4 |
| α-alkyl-alkanols | 4.3 |
| Others | 5.0 |
| | 100.0 |

It will be noted that Oxo alcohols derived from the olefins produced by $C_3$-$C_4$ polymerization are mostly methyl substituted.

Of the great number of organic hydroxyl containing compounds that are operable for preparing the sulfite esters of this invention it has been found that best overall results are obtained if the branched chain alcohols, such as the Oxo alcohols, are first condensed with an appropriate amount of alkylene oxide, such as propylene oxide or ethylene oxide, to form esters of polyalkylene glycols. The viscosity of the final products will increase with an increase in the amount of alkylene oxide condensed with the alcohol. The viscosity of the final product can thus be adjusted to any desired level. If desired, the alcohols used may contain sulfur or other elements in addition to carbon, hydrogen and oxygen.

The invention will be more fully explained by reference to the following illustrative examples.

EXAMPLE 1

A 5 liter 4 necked flask equipped with a stirrer, condenser, thermometer and dropping funnel was charged with 300 2 g. (19 moles) of $C_{10}$ Oxo alcohol (derived from tripropylene). To this was added 1071 g. (9 moles) of $SOCl_2$ during 35 minutes at 25° C. to 45° C. Heat was then applied and the temperature raised to 100° C. during 1 hour. The source of heat was then removed and the product was blown with $N_2$ to remove the trace of HCl. Yield of crude sulfite ester=3380 g.

Purification of the sulfite was carried out by first washing it with 5% $Na_2CO_3$ solution followed by three water washes, all at room temperature. After drying with $Na_2SO_4$ the sulfite was distilled in a short path still under reduced pressure. The distillate between 122°–143° C. at 0.1 mm. pressure which mounted to 84% of the charge had the following analysis and inspection:

| | |
|---|---|
| Percent sulfur | 8.54 |
| Acid No ceq./gm | 0.0003 |
| Ester No ceq./gm | 0.524 |
| Saybolt visc. at 100° F | 50.4 |
| Saybolt visc. at 210° F | 33.5 |
| Viscosity index | 103 |
| Flash point °F | 360 |
| Pour point, below °F | —75 |

EXAMPLE 2

This preparation was carried out in a similar manner to that for the $C_{10}$ Oxo sulfide. It was likewise distilled under reduced pressure in a short path still and most of the distillate was collected at 180°–185° C. at 0.15 mm. which has the following analysis and inspection:

| | |
|---|---|
| Percent sulfur | 7.01 |
| Acid No ceq./gm | 0.0014 |
| Ester No ceq./gm | 0.429 |
| Saybolt visc. at 100° F | 95.1 |
| Saybolt visc. at 210° F | 39.1 |
| Viscosity index | 106 |
| Flash point °F | 435 |
| Pour point, below °F | —75 |

EXAMPLE 3

$C_{13}$ Oxo alcohol was condensed with an average of 3.2 moles of ethylene oxide. This alcohol was then converted into a sulfurous acid ester as follows:

One mole of the alcohol was treated with ½ mole of thionyl chloride by adding the latter to the former drop by drop with rapid stirring. During the addition of the thionyl chloride, the temperature was kept at 30° C. and on completion of the addition the mixture was stirred at room temperature for 2 additional hours. The temperature was then raised to 130° C. for 1 hour. Nitrogen was blown through the reaction mixture throughout the treatment.

On completion of the reaction, the product was transferred into a Claisen flask and topped to 250° C. metal bath temperature under 1 mm. pressure. Only a few drops of distillate were obtained which were discarded. The undistilled residue consisted of a straw-colored viscous oil showing the following properties:

| | |
|---|---|
| Saybolt vis. at 100° F | 207.9 |
| Saybolt vis. at 210° F | 51.5 |
| Viscosity index | 137 |
| Flash point °F | 450 |

EXAMPLE 4

In this case $C_{13}$ Oxo alcohol was condensed with an average of 6.8 moles of ethylene oxide. The ether of polyethylene glycol thus obtained had the following properties:

| | |
|---|---|
| Saybolt vis. at 100° F | 154.0 |
| Saybolt vis. at 210° F | 46.0 |
| Viscosity index | 136 |

This ether was then condensed with thionyl chloride as described in Example 1. The resulting oil consisted of a straw-colored viscous fluid with the following properties:

| | |
|---|---|
| Saybolt vis. at 100° F | 249.3 |
| Saybolt vis. at 210° F | 56.5 |
| Viscosity index | 140 |
| Flash point °F | 455 |
| Pour point °F | 0 |

EXAMPLE 5

In a manner similar to that described above, thionyl chloride was condensed with isodecyl lactate. The resulting product was a straw-colored oil having the following characteristics:

| | |
|---|---|
| Saybolt vis. at 100° F | 121.1 |
| Saybolt vis. at 210° F | 40.4 |
| Viscosity index | 72.5 |
| Flash point °F | 425 |
| Pour point °F | —50 |

The synthetic oils described above are compatible with a great number of additive agents commonly used to improve specific properties of lubricating oils. For instance, these new oils may be blended with detergent additives, pour point depressors, oxidation inhibitors, viscosity index improvers, and the like. They may be used to enhance the performance of mineral lubricating oils by blending therewith in any proportion.

It has also been found that the sulfites of this invention may be used to prepare lubricating grease compositions which have excellent properties at temperature extremes and are useful in conditions calling for high extreme pressure resistance. It has also been found that when the sulfites are employed as a base oil for grease compositions, the purification of the crude ester will be unnecessary if an excess of free alkali is used in the grease formulation. The presence of the free alkali neutralizes the acid impurity and also acts as a buffer to keep the product neutral.

The following examples illustrate this concept of the invention.

EXAMPLE 6

Preparation of greases

FORMULATION

| Ingredients: | Weight percent |
|---|---|
| Complex lithium soap (lithium soap of hydrogenated fish oil acids and crotonic acid, co-neutralized in 1:1 mol ratio) | 15.0 |
| Phenyl alpha naphthylamine | 1.0 |
| $C_{10}$ Oxo sulfite | 84.0 |

PREPARATION

Prepared by mixing dry pre-formed soap containing 1.0% excess lithium carbonate or hydroxide and sulfite together and heating to 480° F. Added phenyl alpha naphthylamine and cooled the fluid mass rapidly in thin layers.

| | |
|---|---|
| Appearance | Excellent smooth grease after homogenization of grease cake. |
| Odor | slightly sweet. |
| Penetration, 77° F., mm./10: | |
| Unworked | 310. |
| Worked | 330. |
| Dropping point, °F | 420. |
| Load carrying | Carried 9 weights or Almen machine. |

EXAMPLE 7

FORMULATION

| Ingredients: | Percent weight |
|---|---|
| Lithium stearate | 10.00 |
| Lithium hydroxy stearate | 10.00 |
| $C_{10}$ Oxo sulfite | 39.50 |
| Di-2-ethylhexyl sebacate | 39.50 |
| Phenyl alpha naphthylamine | 1.00 |

PREPARATION

Same as in Example 6.

PROPERTIES

| | |
|---|---|
| Appearance | Excellent smooth grease after homogenization. |
| Penetrations, 77° F., mm./10: | |
| Unworked | 240. |
| Worked (60 strokes) | 310. |
| Worked (80,000 strokes) | 275. |
| Dropping point, °F | 360. |
| Almen test (weights carried) | 9. |

EXAMPLES 8 and 9

FORMULATION

| Ingredients | Percent Weight | |
|---|---|---|
| | 8 | 9 |
| Lithium Stearate | 10.00 | 5.00 |
| Lithium Hydroxy Stearate | 10.00 | 5.00 |
| Phenyl alpha naphthylamine | 1.00 | 0.50 |
| $C_{13}$ Oxo sulfite | 39.00 | 49.50 |
| Di-2-ethylhexyl sebacates | 40.00 | 40.00 |

PROPERTIES

| | | |
|---|---|---|
| Appearance | Excellent Smooth uniform product | |
| Dropping Point, °F | 360 | 342 |
| Penetrations, 77° F., mm/10: | | |
| Unworked | 245 | 290 |
| Worked (60 strokes) | 260 | 310 |
| Worked (80,000 strokes) | 305 | 349 |
| Water solubility | Insoluble | |
| Almen Test (Weights carried) | 9 | 9 |

To reiterate briefly, the instant invention relates to a new class of synthetic lubricating compositions having outstanding properties at both low and high temperatures which comprise sulfite esters of organic hydroxyl containing compounds having at least one hydroxyl group that is alcoholic in nature. The general formula may be written $$A-O-\underset{\underset{O}{\|}}{S}-O-B$$

wherein A and B are selected from the group consisting of organic radicals having from 2 to 60 carbon atoms, the total number of carbon atoms in the molecule being from 20 to 120 carbon atoms. The group of compounds contemplated have viscosities at 210° F. within the range of from 2 to 60 centistokes, an ASTM pour point below about 35° F. and a flash point above about 300° F. Especially preferred are the sulfite esters of the polyether glycols prepared by reacting an alkylene oxide with an alcohol.

What is claimed is:

1. A synthetic lubricating composition having an ASTM pour point below about 35° F., a flash point above about 300° F., and a kinematic viscosity within the range of 2 to 60 centistokes, which comprises an ester of the formula $$A-O-\underset{\underset{O}{\|}}{S}-O-B$$

wherein A and B are organic radicals derived from branched chain ether alcohols having a branched chain alkyl group of from 8 to 13 carbon atoms, and containing from 3 to 7 ethylene oxide units.

2. A synthetic lubricating composition having an ASTM pour point below about 35° F., a flash point above about 300° F., and a kinematic viscosity within the range of 2 to 60 centistokes which comprises a blend of an ester of the formula $$A-O-\underset{\underset{O}{\|}}{S}-O-B$$

wherein A and B are organic radicals selected from the group of $C_8$ to $C_{13}$ branched chain alkyl groups with an equal amount of di-2-ethylhexyl sebacate.

3. A lubricating composition according to claim 2 containing combined therein a minor, but grease forming, amount of a lithium soap of a fatty acid.

4. A synthetic lubricating grease composition which comprises a blend of $C_{10}$ to $C_{13}$ branched chain alcohol sulfite esters with an equal portion of the $C_8$ branched chain ester of sebacic acid thickened to a grease consistency with the lithium soap of fatty acids.

5. A grease composition according to claim 4 wherein the fatty acid is a mixture of stearic acid and hydroxy stearic acid.

6. A synthetic lubricant having an ASTM pour point below about −15° F., a flash point above about 375° F. and a kinematic viscosity at 210° F. within the range of 2 to 13 centistokes which comprises the sulfite ester of branched chain polyether alcohols having branched chain alkyl groups of from 8 to 13 carbon atoms and containing from 3 to 7 alkylene oxide units selected from the group of ethylene and propylene oxide units.

References Cited in the file of this patent

UNITED STATES PATENTS

| | | |
|---|---|---|
| 2,309,829 | Davis | Feb. 2, 1943 |
| 2,323,789 | Bond | July 6, 1943 |
| 2,340,331 | Knutson et al. | Feb. 1, 1944 |
| 2,377,148 | Hechenbleikner | May 25, 1945 |